United States Patent [19]

Wright et al.

[11] 4,023,257

[45] May 17, 1977

[54] METHOD OF MAKING A HOLLOW ARTICLE HAVING A REINFORCED APERTURE

[75] Inventors: Stephen J. Wright, Edinburg, Ind.; William K. Neidinger, Mount Prospect, Ill.

[73] Assignee: NL Industries, Inc., New York, N.Y.

[22] Filed: Jan. 21, 1976

[21] Appl. No.: 650,957

[52] U.S. Cl. .............................. 29/460; 29/527.1; 264/275; 264/277; 264/279; 264/310; 264/334

[51] Int. Cl.² ..................... B29C 5/04; B29D 3/02

[58] Field of Search .......... 264/310, 311, 275, 277, 264/278, 279, 334; 29/460, 527.1, 527.2, 527.3, 527.4

[56] References Cited

UNITED STATES PATENTS

| | | | |
|---|---|---|---|
| 3,100,643 | 8/1963 | Nicholls et al. | 264/310 |
| 3,299,501 | 1/1967 | Cox | 264/310 |
| 3,557,274 | 1/1971 | Kowell | 264/275 |
| 3,559,308 | 2/1971 | Bernier et al. | 264/277 |

*Primary Examiner*—Willard E. Hoag

*Attorney, Agent, or Firm*—Oliver E. Todd, Jr.

[57] ABSTRACT

An improved method for making leak-proof connections to fuel tanks and other hollow articles rotationally molded from synthetic resinous materials, and particularly from relatively soft materials such as polyethylene. Prior to molding the article in a conventional rotational mold process, one or more male or female studs or similar threaded fittings are bolted to or otherwise temporarily held against the interior surface of the mold at a location which corresponds to the location for the leak-proof connections in the finished article. When a number of threaded fittings are located relatively close together or are spaced around an opening in an article, the fittings are preferably interconnected by wires or other metal support members which is embedded in the finished article. The support member strengthens the connection and also maintains a fixed spacing between the fittings. The article is then rotationally molded such that the fitting is embedded in the wall of the finished article. After molding is completed and the article is removed from the mold, a leak-proof connection is made to the threaded fitting which forms an integral part of the article wall.

3 Claims, 10 Drawing Figures

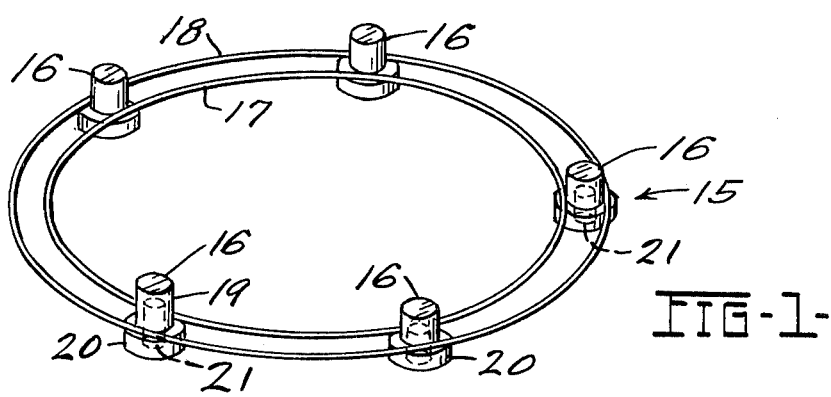
FIG-1-
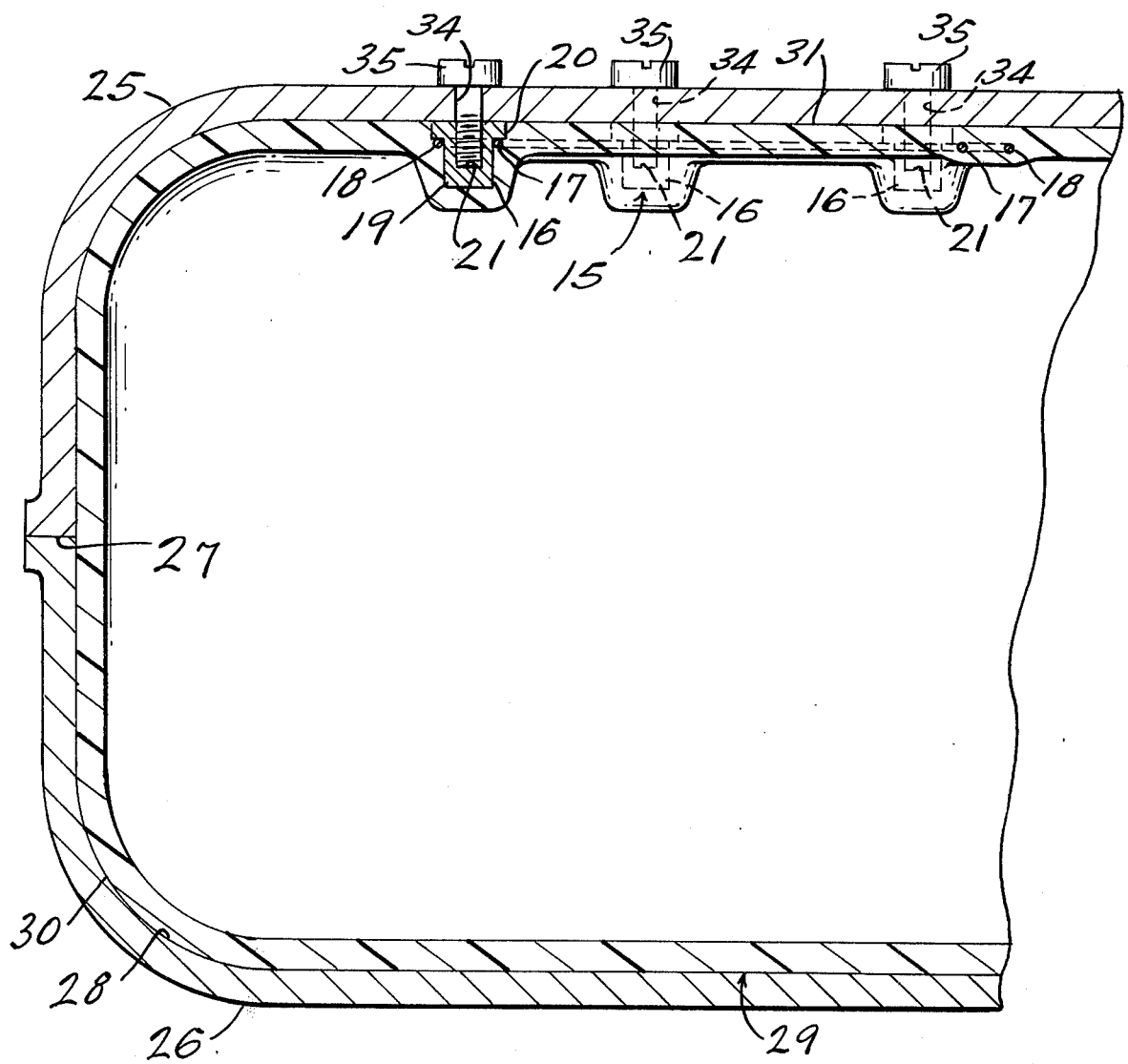
FIG-2-

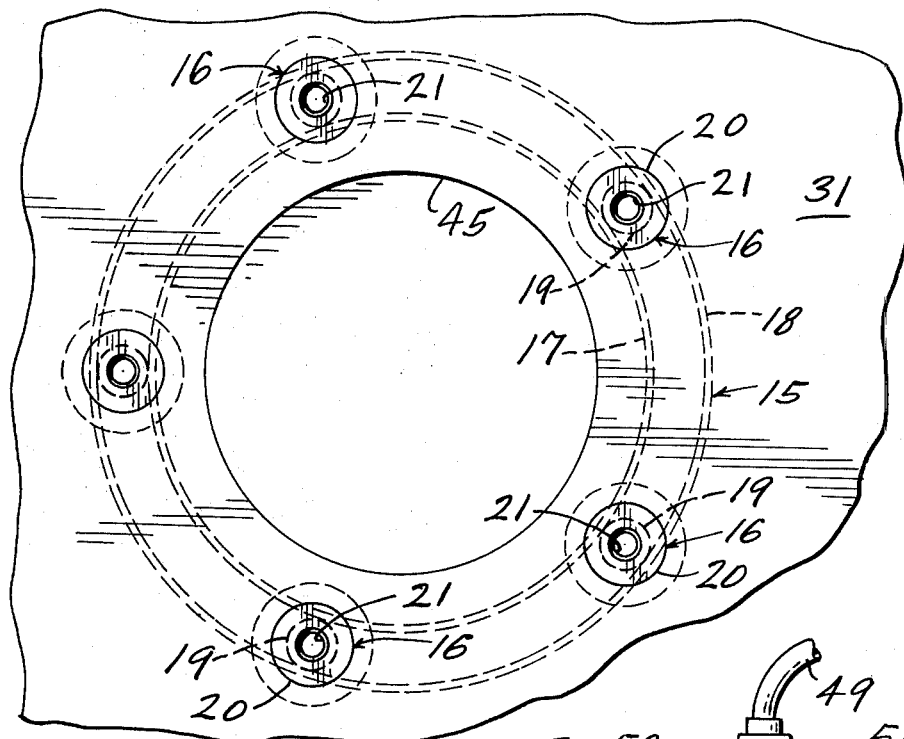
FIG-3-
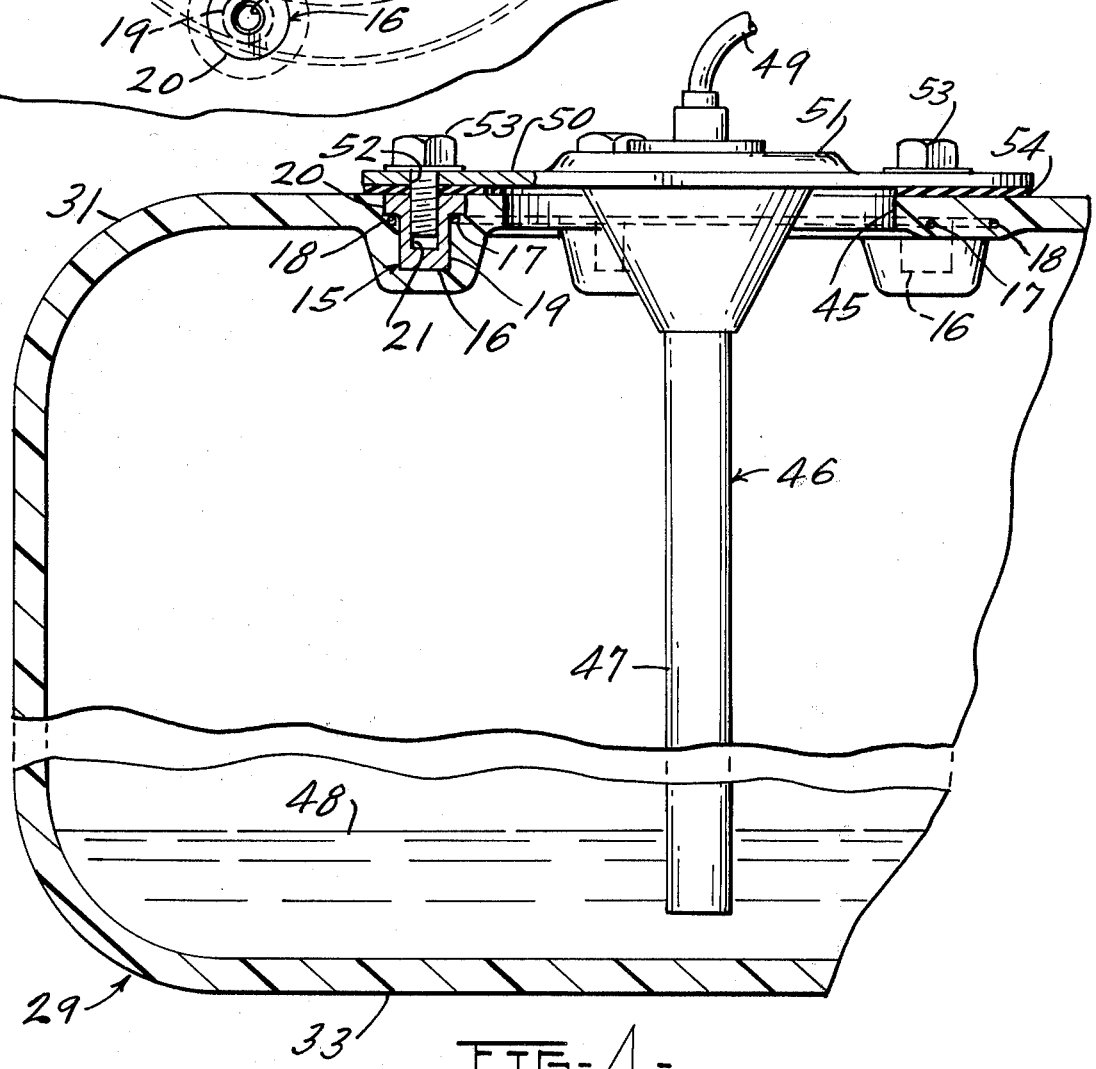
FIG-4-

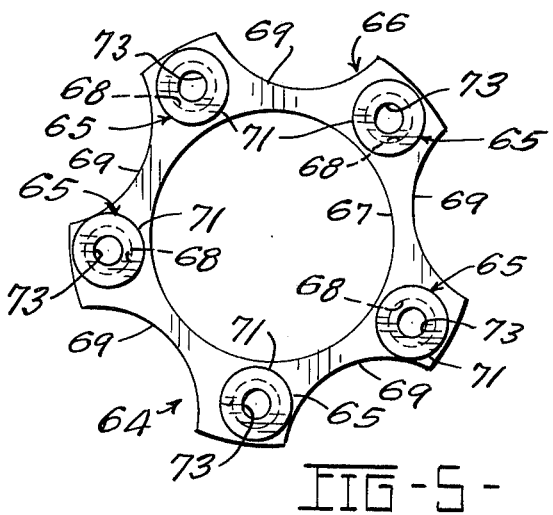
FIG-5-
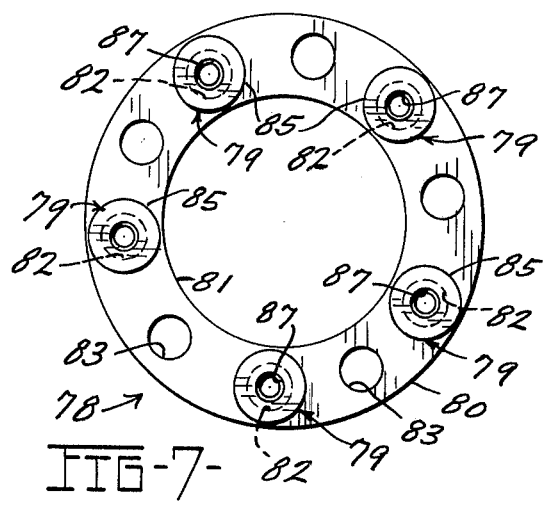
FIG-7-
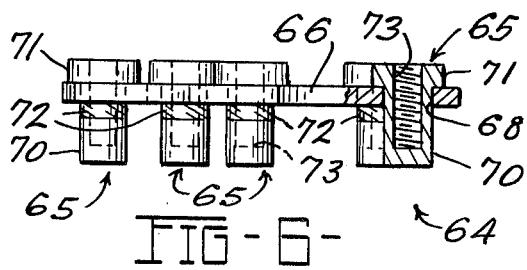
FIG-6-
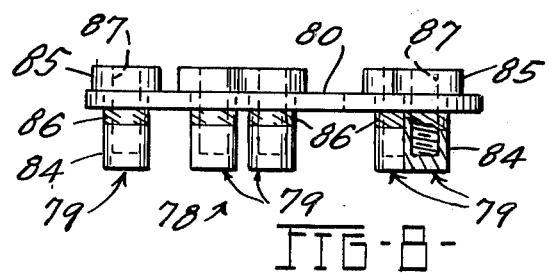
FIG-8-
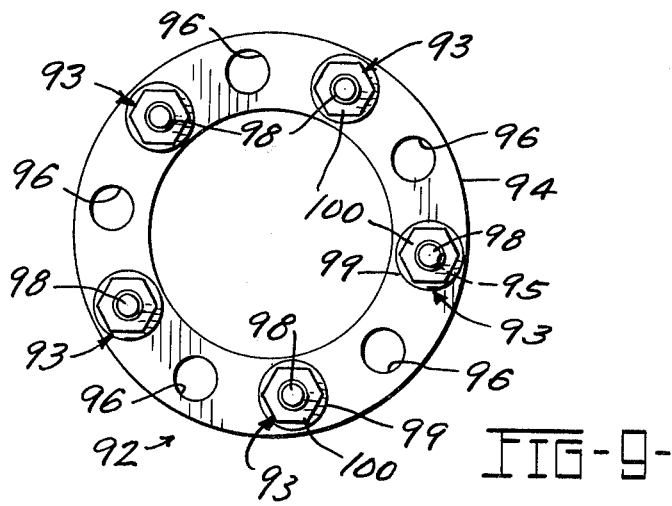
FIG-9-
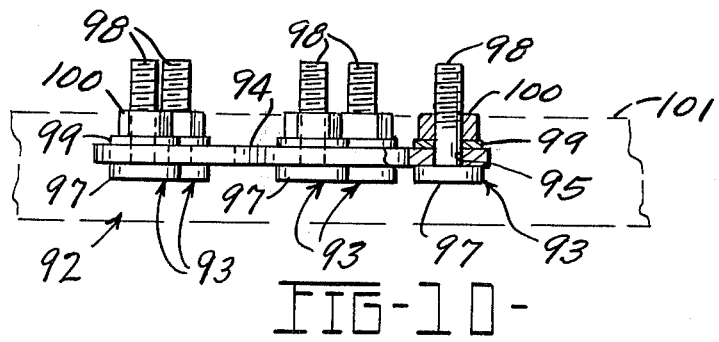
FIG-10-

METHOD OF MAKING A HOLLOW ARTICLE HAVING A REINFORCED APERTURE

BACKGROUND OF THE INVENTION

This invention relates to rotational molding and more particularly to an improved method for forming leak-proof connections to hollow articles rotationally molded from a synthetic resinous material.

Various processes used for commercially molding articles from synthetic resinous materials include, for example, blow molding, injection molding and rotational molding. Each specific molding application must be investigated to determine the best process. Rotational molding is useful for producing hollow articles of a very uniform wall thickness. If the mold is shaped to allow contact between the inner mold surfaces and the resinous material and the inner mold surfaces are heated uniformly, then the walls of the finished article will be uniform to within plus or minus five percent of the desired value.

Rotational molding generally involves heating of a charged mold while simultaneously rotating biaxially or about two different axes until, in the case of a thermoplastic resinous material, the resinous material melts. As the mold is rotated biaxially, the resinous material tends to puddle or flow to the lowest point in the mold cavity and gradually coats the interior walls or surfaces of the mold cavity. The mold is then cooled to cure the resin while continuing the biaxial rotation. After the mold is cooled, the molded article is removed from the mold cavity and the mold is recharged with raw material for molding the next article. The molded article will have exterior surfaces which are excellent reproductions of the interior surfaces of the mold cavity. Typical apparatus for rotationally molding articles is shown, for example, in U.S. Pat. No. 2,957,202 which issued Oct. 25, 1960 to Rekettye. Other common types of apparatus are also described, for example, in the 1968 *Modern Plastics Encyclopedia*, Vol. 45, No. 1A, September 1967, at page 825, and in the 1969–1970 *Modern Plastics Encyclopedia*, Vol. 46, No. 10A, October 1969, at page 568.

Rotational molding is commonly used for manufacturing tanks and other hollow articles from synthetic resinous materials because a hollow, single-piece tank can be easily manufactured with uniform walls. Other molding processes may require that a hollow tank be manufactured as two or more separate shells which are bonded together. This necessitates extra manufacturing steps and the finished tank will have a seam which may leak or may be weaker than the remainder of the tank. Furthermore, the cost of the molding machinery and of the molds is generally more for injection molding and blow molding than for rotational molding. However, labor costs for operating rotational molding equipment may be higher than for other processes. Also, some difficulty has occurred in the past when attaching leak-proof fittings to rotationally molded articles such as fuel tanks. In the past, fuel tanks have been rotationally molded from relatively hard synthetic resins, such as nylon, which is then drilled and tapped for receiving a threaded fitting or connector. Tanks manufactured in this manner are expensive due to the cost of the nylon and also threads in the nylon are easily stripped if the fittings are not carefully attached, resulting in leakage. Less expensive, softer resins, such as a polyethylene, have been unsatisfactory because threaded fittings do not hold in the soft tank walls and other methods for making leak-proof connections to the soft tank walls were unsatisfactory.

SUMMARY OF THE INVENTION

According to the present invention, an improved method is provided for making strong, leak-proof connections to hollow articles, such as fuel tanks, formed by rotational molding. The invention is useful for making such connections to articles molded from relatively soft synthetic resinous materials which are not suitable for drilling and tapping, such as a polyethylene. Leak-proof connections are made to fittings which are embedded in the walls of the article during the rotational molding process.

In one embodiment of the invention, a single fitting in the form of either a male or female threaded stud is temporarily attached to the interior wall or surface of the rotational mold at each desired location for a connection to the finished article. A female stud is bolted to the mold by passing a bolt from outside the mold through a hole in the mold wall and screwing into the stud. A male stud is bolted to the mold by passing its threaded end through a hole in the mold wall from inside the mold cavity and attaching a nut or other retaining device to the end which projects outside the mold. When the article is then molded, the portion of the stud inside the mold cavity becomes embedded in the wall of the article with the interior surface of the article extending continuously over the stud. The stud is then available for making a strong, leak-proof connection to the article.

In many applications, a leak-proof connection is needed at a large opening through a wall of the molded article. Such an opening may be needed, for example, for attaching a fluid level sending unit to a fuel tank. A plurality of the threaded fittings are interconnected by wires or other metal support member such that they may be attached as a unit to the mold for embedding in the molded article. When the fittings are embedded in the molded article, they are spaced around a desired location for the opening. After the article is molded, the opening is cut into the article between the fittings. A strong, leak-proof connection is made to the article by bolting a flange on the device to be connected at the opening, such as the fluid level sending unit for a fuel tank, to the fittings spaced around the opening. The interconnecting wires or other support member between the fittings are embedded in the wall of the article with the fittings to further strengthen the connection. The connection to the article will be strong and leak-proof, even though the article is molded from a relatively soft synthetic resinous material.

Accordingly, it is an object of the present invention to provide an improved method for rotationally molding articles to which connections are to be made.

Another object of the invention is to provide an improved method for making connections to articles rotationally molded from a synthetic resinous material.

Still another object of the invention is to provide an improved method for making leak-proof connections to articles rotationally molded from relatively soft synthetic resinous materials.

Other objects and advantages of the invention will become apparent from the following detailed description, with reference being made to the accompanying drawings.

BRIEF DESCRIPTION OF THE DRAWINGS

FIG. 1 is a perspective view of an assembly comprising a plurality of threaded fittings interconnected by wires for embedding in a rotationally molded article for making a connection to such article in accordance with the present invention;

FIG. 2 is a cross-sectional view of a fragment of a rotational mold with a tank molded therein and showing a plurality of interconnected threaded fittings embedded in the surface of the molded tank in accordance with the present invention;

FIG. 3 is a top plan view of a fragment of the tank of FIG. 2 showing the plurality of fittings of FIG. 1 embedded in the upper surface of such tank;

FIG. 4 is a cross-sectional view of the tank from FIG. 2 and showing a leak-proof connection made to the threaded fittings in accordance with the present invention;

FIG. 5 is a top plan view of a modified embodiment of a plurality of interconnected threaded fittings for embedding in a rotationally molded article;

FIG. 6 is a partially broken away elevational view of the plurality of interconnected threaded fittings of FIG. 5;

FIG. 7 is a top paln view of a further modified embodiment of a plurality of interconnected threaded fittings for embedding in a rotationally molded article;

FIG. 8 is a partially broken away elevational view of the plurality of interconnected threaded fittings of FIG. 7;

FIG. 9 is a top plan view of a plurality of interconnected threaded fittings for embedding in a rotationally molded article according to another modified embodiment of the invention; and FIG. 10 is a partially broken away elevational view of the plurality of interconnected threaded fittings of FIG. 9.

DESCRIPTION OF THE PREFERRED EMBODIMENTS

The present invention is directed to an improved method for forming connections, and particularly leak-proof connections, to articles formed from rotationally molded synthetic resinous materials. The method is particularly useful for making strong leak-proof connections to one-piece hollow articles, such as fuel tanks, where the interior of the article is unaccessible while making the connection. The following description is directed specifically to making different types of leak-proof connections to a rotationally molded vehicle fuel tank. However, this description is merely exemplary. It will be appreciated that the invention is equally applicable for making connections to other types of rotationally molded articles and that the connections are desirable for their strength in addition to being leak-proof. The invention is also adaptable to making connections to articles molded by other processes, such as injection molded, blow molded or vacuum formed articles.

The method of the present invention is adaptable for use with conventional rotational molding methods and apparatus. In one common type of rotationally molding apparatus, three sets of molds are mounted on the ends of three arms extending from a turret. The turret is rotatable for moving the molds between three stations: a loading and unloading station, a heating station and a cooling or curing station. Each mold may have one cavity for forming a single article or a plurality of cavities for simultaneously forming a plurality of articles and is typically formed from two sections which are separable for loading raw material and unloading the finished article. Initially, all cavities in the molds on one arm are charged with either a powdered or a liquid synthetic resinous material and the mold sections are locked together. The turret then rotates to move the mold into an oven. While the mold is in the oven, it is slowly rotated biaxially or about two different axes. Typically, the mold is rotated at a velocity in the range of about zero to 40 rpm on a minor axis and of about zero to 12 rpm on a major axis with a 4:1 rotation ratio common for molding symmetrical articles. As the mold is heated in the oven, the resin puddles at the bottom of each cavity. The biaxial rotation uniformly coats the walls of each mold cavity to form uniform walled hollow articles having exteriors which correspond to the shape of the mold cavities. The turret then advances the mold to a cooling station. While continuing the biaxial rotation, the mold is cooled typically by forced air cooling or by a water spray, until the molded articles have cured and cooled sufficiently to be handled. The turret then advances the mold to the loading and unloading station where the mold sections are separated and the finished articles are removed. The mold is then ready for reloading for another molding cycle. Apparatus of this type is disclosed in the above-cited U.S. Pat. No. 2,957,202, and the disclosure of this patent is incorporated herein. Other types of rotational moldng apparatus are also well known and commercially available. For example, the mold may be biaxially rotated from a fixed location and the heating and cooling steps may be accomplished by passing first a heated and then a cooled heat transfer fluid through passages formed in the walls of the mold.

According to the present invention, threaded fittings are bolted or otherwise releasably attached to the interior cavity walls of a conventional rotational mold prior to charging the mold cavity with synthetic resinous material. The fittings are attached from the exterior of the mold to permit removal of the bolts or other attaching devices prior to opening the mold to remove the finished article. The fittings are selected to provide a desired type of connection to the finished article and may comprise, for example, male or female studs. As used herein, a male stud is any threaded member which will project from a wall of the molded article. The male stud may comprise, for example, a bolt. The bolt head is embedded in the molded article in a manner such that the threaded end projects from the side of the article for making a connection thereto with a nut, a spring clip, a resilient plastic cap or some similar releasable retaining device. As used herein, a female stud is any fitting have an internal threaded opening. When the female stud is embedded in a wall of the molded article, the threaded opening receives a screw or similar threaded male connector for making a connection to the article. The female stud may comprise a commercial threaded insert or a nut. For a strong connection, a flanged nut may be used. The hexagonal sides of the nut provide a strong mechanical connection to prevent rotation of the nut in the article wall, while the flange provides a strong mechanical anchor to prevent axial movement of the nut in the article wall. The threaded opening in the female stud either may be blind or it may extend through the stud. When a screw is to be attached to the stud embedded in the wall of a liquid container, it is preferable to have a blind opening in the female stud.

One or more threaded fittings is bolted or otherwise attached to the portion of the mold cavity which corresponds to each location at which a connection is to be made to the finished article. The article is then rotationally molded in a conventional manner, at which time the threaded fittings become embedded in the wall of the article. When the bolts are removed from the exterior of the mold and the article is removed from the mold cavity, leak-proof connections are made to the threaded fittings embedded in the article walls. Since the fittings are bolted to the wall of the mold cavity through a hole formed in the mold wall, the locations of the leak-proof connections to all articles are precisely located by the locations of the holes in the mold. Furthermore, the fittings are precisely located in all successively molded articles.

In some applications, it is necessary to make leak-proof connections to a hollow article around a relatively large opening into the article. For example, in a fuel tank, an opening having a diameter on the order of two to five or more inches may be required for attaching a fuel level sending unit. A leak-proof connection is made at a large opening into the hollow article by embedding a number of threaded fittings in a spaced relationship in the wall around such opening and making the connection to these fittings.

Referring now to FIG. 1, a first embodiment is shown of an assembly 15 for use in making a leak-proof connection around a large opening in the wall of a rotationally molded article. The assembly 15 comprises a plurality (five shown) of threaded fittings 16 in the form of female studs which are interconnected by means of a pair of wires 17 and 18. Each stud 16 includes a cylindrical body 19 having at one end an enlarged diameter shoulder or flange 20. A blind hole 21 is drilled axially through the flange 20 and into the body 19 and the hole 21 is threaded by means of a conventional tap. The individual female studs or fittings 16 are initially positioned in the arrangement in which the studs 16 are to be embedded into a molded article. While the studs 16 are maintained in this arrangement, the wires 17 and 18 are welded or brazed to the shoulder or flange portions 20 of each stud 16 to maintain this spacing and arrangement.

Turning now to FIG. 2, a fragmentary vertical cross section is shown of a portion of a rotational mold for molding a fuel tank and of a fuel tank molded therein with threaded fittings embedded in the walls of the tank for making leak-proof connections thereto. The rotational mold comprises an upper mold section 25 and a lower mold section 26 which are clamped together in a conventional manner along a seam 27. The mold sections 25 and 26 define an interior cavity 28 having the dimensions of the finished fuel tank. A mold fuel tank 29 is shown in fragment within the mold sections 25 and 26. The fuel tank 29 has an exterior surface 30 which conforms identically to the mold cavity 28. Embedded within an upper wall 31 of the tank 29 is the assembly 15 including the female studs 16.

In accordance with the present invention, each of the plurality of female studs 16 forming the assembly 15 are attached to the upper mold section 25 prior to molding the tank 29. The upper mold section 25 has a plurality of holes or openings 34 formed therein in an arrangement and at the same spacing as the studs 16 are held in the assembly 15 by the wires 17 and 18. The assembly 15 is positioned within the mold cavity 28 and is attached to the upper mold section 25 by means of a plurality of screws 35; one passes through each opening 34 and is threaded into a stud 16. The holes 34 are located in the upper mold section 25 such that when the assembly 15 is attached to the mold section 25, the studs 16 will be located to surround a desired location for a hole to be formed in the tank 29.

After the assembly 15 is attached to the upper mold section 25, the mold is charged with either a powdered or a liquid synthetic resinous material, such as a powdered polyethylene. The fuel tank 29 is then rotationally molded in a conventional manner. During the molding process, the walls of cavity 28 formed by the upper and lower mold sections 25 and 26 are coated uniformly with the heated resin. The resin also coats and completely embeds the female studs 16 and interconnected wires 17 and 18 of the assembly 15. Due to the sharp corners of the studs 16, the portions of the walls of the fuel tank 29 extending over the assembly 15 may vary slightly. Generally, there is a greater buildup over the inside of sharp corners, such as the corners between the female stud 16 and the upper mold section 25. This has the advantage of providing strengthening at these points.

After the fuel tank 29 is rotationally molded and has been cooled sufficiently to permit removal from the mold cavity 28, the bolts 35 are removed from the stud 16. Subsequent to removal of the bolts 35, the mold sections 25 and 26 are released and separated to permit removal of the finished tank 29. In some instances, threaded fittings in the form of a male stud are embedded in the walls of the tank 29 for anchoring the tank when it is installed in a vehicle or for making attachments to the tank 29. In this case, the male stud will be initially positioned within the mold cavity 28 to extend through an opening through the wall of either the upper or lower mold section 25 or 26. A nut is then attached to the end of the threaded fitting projecting from the mold section 25 or 26 to bolt the fitting in place during the molding process. In this case, after the tank is molded, the nut is removed to permit removal of the finished tank from the mold cavity 28.

Referring to FIG. 3, a fragmentary section is shown of the portion of the upper wall 31 of the tank 29 in which the assembly 15 is embedded. Since the female studs 16 were bolted in the mold cavity 28 with the shoulder or flange 20 against the upper mold section 25, the exterior surface of the shoulder or flange 20 is flush with the upper wall 31 of the tank 29. Centered between the spaced studs 16, an opening 45 is cut into the upper wall 31 for receiving, for example, a fuel level sending unit, or other attachment. The opening 45 may be cut in any conventional manner, or it may be formed directly in the tank 29 during the molding process. Openings may be formed in a rotationally molded article by insulating the adjoining portion of the mold wall. The insulation prevents that portion of the wall from being heated sufficiently to melt the resinous material in the case of a thermoplastic resin or, in the case of a thermosetting resin, to cure the resin.

Turning to FIG. 4, the molded fuel tank 29 is shown removed from the mold cavity 28 and with attachments made to the assembly 15. In the exemplary fuel tank 29 shown in FIG. 4, a fuel level sending unit 46 is mounted in the opening 45 through the upper tank wall 31 and a fluid-tight connection is made to the assembly 15. The fuel level sending unit 46 includes a lower section 47 which extends substantially to the bottom of the tank 29 and includes any conventional means for detecting a fuel level 48 in the tank 29. The sending unit 46 either generates an electric signal or applies a variable resistance to a wire 49 which is connected to a fuel gauge or other device responsive to the fuel level 48 in the tank 29. A flange 50 extends from an upper surface 51 of the sending unit 46. The flange 50 has a plurality of holes 52 formed therein to correspond to the spacing of the threaded holes 21 in the female studs 16. Bolts 53 are passed through the flange openings 52 and screwed into the threaded openings 21 formed in the studs 16 embedded in the upper tank surface 31. A suitable gasket material 54 may be positioned between the flange 50 and the upper tank surface 31 such that, when the bolts 53 are tightened in the studs 16, a fluid-tight seal is formed between the flange 50 and the upper tank surface 31. A sufficient number of the studs 16 are embedded in the upper tank wall 31 such that the fluid-tight seal is maintained, even when the tank 29 is formed from a relatively soft, flexible synthetic resinous material such as a polyurethane. Rigidity of the tank 29 at the seal is maintained by the wires 17 and 18 which interconnect the studs 16 and are also embedded in the upper tank wall 31.

Turning now to the remaining figures, modified embodiments of the assembly 15 of FIG. 1 are shown for interconnecting a plurality of threaded fittings prior to embedding in a rotationally molded article. FIGS. 5 and 6 show an assembly 64 which includes a plurality of threaded fittings 65 mounted in a support member 66. The support member 66 is formed from a flat piece of stamped metal having an interior opening 67 of a diameter larger than the opening which will be formed in the rotationally molded article in which the support member 66 will be embedded. A plurality of holes 68 are formed in the support member 66 around the opening 67 for mounting the plurality of threaded fittings 65. Between each adjacent opening 68, the support member 66 has a cut-away portion 69. The width or thickness of the support member 66 at each cut-away portion 69 is of a minimum value, but being sufficient to provide the necessary rigidity and strength between the fittings 65. This is desirable since the synthetic resinous material from which the article is eventually formed generally will not bond to the support member 66. If the cut-away portions 69 are not provided and the support member 66 is relatively wide, the molded article will be weakened where the assembly 64 is embedded into the article.

Each of the fittings 65 has a cylindrical body portion 70 terminating at an enlarged diameter flanged end 71. A portion 72 of the body 70 adjacent the flanged end 71 is provided with a relatively coarse thread of a diameter slightly greater than the openings 68 in the support member 66. When the fittings 65 are pressed into the openings 68 in the support member 66, the threaded portion 72 engages the support member 66 for tightly holding the fittings 65 in the support member openings 68. Each threaded fitting 65 also includes a blind threaded hole 73 which extends through the flanged end 71 and into the cylindrical body 70. When the assembly 64 is embedded into a molded article, a leak-proof connection is made by threading bolts or other threaded members into the threaded opening 73, in a manner similar to that shown in FIG. 4 with the assembly 15.

Still another embodiment of an assembly 78 including a plurality of threaded fittings 79 mounted in a support member 80 is shown in FIGS. 7 and 8. The support member 80 is generally in the form of a large diameter flat washer having an interior opening 81 of a radius greater than the radius of the opening to be formed in the rotationally molded article in which the assembly 78 will be embedded. The assembly 78 is attached to the rotational mold during molding of the article such that the support member 80 is concentric with the location of the desired opening in the article to which a leak-proof connection is to be made. The support member 80 includes a plurality of holes 82 formed therein, one for receiving each of the threaded fittings 79. In addition, a plurality of holes or openings 83 are formed in the support member 80, with at least one opening 83 formed between each adjacent pair of openings 82. When the support member 80 is embedded in a rotationally molded article, the synthetic resinous material will completely surround the support member 80 and will also extend continuously through the openings 83. The portion of the material extending through the openings 83 greatly increases the strength of the molded article at the point in which the assembly 78 is embedded in the article.

The threaded fittings 79 are in the form of a female stud comprising a cylindrical body 84 terminating at an enlarged diameter flanged end 85. The portion of the body 84 adjacent the flanged end 85 includes a relatively coarse thread 86. The diameter of the thread 86 is slightly greater than the diameter of the openings 82 in the support member 80 so that, when the threaded fittings 79 are pressed into the openings 82, the thread 86 engages the sides of the openings 82 in the support member 80 for holding the fittings 79 and the support member 80 together. A blind threaded opening 87 is formed through the center of the flanged end 85 and into the body 84 of each fitting 79 for connecting a bolt or other threaded member which is to be attached to the finished molded article. During manufacturing of the article in accordance with the present invention, bolts are inserted through the rotational mold and into the threaded openings 87 of the fittings 79 for positioning the assembly 78. After the article is molded, the bolts are removed from the threaded openings 87 to permit removal of the article from the mold cavity, as discussed above in reference to FIGS. 2–4. Although the fittings 79 are shown as being attached to the support member by pressing into the openings 82, it will be appreciated that other methods may be used for attaching the fittings 79 to the support member 80. For example, the flange 85 on the fittings 79 may be welded to the support member 80 through conventional welding techniques. Or, the fittings 79 may be bonded to the support member 80 with a synthetic resinous material such as an epoxy or with a suitable adhesive which will not soften while the article is being molded. The bond between the fittings 79 and the support member 80 should be sufficiently strong as to prevent any rotation of the fittings 79 as a bolt is threaded into the fitting opening 87.

From the various embodiments of the apparatus 15 of FIG. 1, the apparatus 64 of FIGS. 5 and 6 and the apparatus 78 of FIGS. 7 and 8, a plurality of fittings in the form of what has been designated as a female stud have been interconnected for embedding around an opening into a rotationally molded article. As previously indicated, a plurality of male studs may also be interconnected for embedding into a rotationally molded article. FIGS. 9 and 10 show an assembly 92 comprising a plurality of threaded fittings 93 attached to a support member 94. The support member 94 is similar to the support member 80 of FIGS. 7 and 8 and includes a plurality of openings 95 for receiving the threaded fittings 93 and a plurality of openings 96 spaced between each adjacent pair of openings 95 for increasing the strength of a rotationally molded article in which the assembly 92 will be embedded. In the assembly 92, the threaded fittings 93 are in the form of bolts or male studs. The threaded fittings 93 each include a bolt having a head 97 and a threaded shank 98. The shank 98 of each fitting 93 is passed through one of the openings 95 in the support member 94, a washer 99 is placed on the shank 98 and a nut 100 is then threaded onto the shank 98. The nut 100 is tightened against the washer 99 and the support member 94 sufficiently to prevent rotation of the threaded shank 98 when a connection is made to the shank 98 after the assembly 92 is embedded in a wall of a rotationally molded article. To increase the strength of the assembly 92 and particularly to prevent rotation of the threaded fittings 93, it may be desirable to also weld or otherwise attach the head 97 of each fitting 93 to the support member 94.

In molding an article, the assembly 92 is attached to a wall of the interior cavity of a rotational mold by passing the shank portion 98 of each fitting 93 through a corresponding opening in the wall of such mold. A nut (not shown) is then temporarily threaded onto each shank 98 to hold the fittings 93 in place during molding. Or, some other suitable temporary retaining device may be attached to each shank 98 to hold the fitting 93 in place during molding. For example, a spring clip may be clamped on the end of the shank 98 projecting from the mold or a resilient plastic or rubber cap may be pressed on the end of the shank 98. The nuts 100 and the washers 99 maintain a desired spacing between the support member 94 and the wall of the mold. An article is then rotationally molded in a conventional manner such that the assembly 93 is embedded into a wall of the article, a portion of which is shown by the dashed lines 101 in FIG. 10. Subsequent to molding the article, the nuts or other retainers are removed from the threaded shanks 98 and the article is removed from the rotational mold cavity. At this time, the surface of the nuts 100 will be flush with the surface of the wall 101 of the article and threaded shanks 98 will project from such wall 101 to form male studs for making a strong leak-proof connection to the article.

In the above description, several embodiments of different types of threaded fittings have been disclosed. These fittings have been described as male and female studs and have generically been referred to as threaded fittings. It will be appreciated that various other types of threaded fittings may be used in accordance with the present invention for embedding into the wall of an article while such article is rotationally molded from a synthetic resinous material. The invention is also adaptable to making leak-proof connections to articles formed by other known molding processes. In each case, the connection is made to a threaded fitting which is embedded into the article during molding. It will also be appreciated that various types of support members may be used for interconnecting a plurality of threaded fittings prior to embedding in an article. The support member will generally have an annnular or a flat annular shape when the fittings are to surround a round opening in the article. However, other configurations will also be apparent to those skilled in this art. The support member may have an irregular shape, for example, when the fittings are to surround an irregular shaped opening in the article. Variations in the fittings and the manner of making connections to the fittings embedded in the finished article may be made without departing from the spirit and the scope of the claimed method for producing the rotationally molded article.

In the following claims, the threaded fittings are described as being attached to the interior mold surface by bolting. As used herein, a female threaded fitting is bolted to the mold by passing a screw through a hole or opening in the mold from outside the mold and threading the screw into the fitting. A male threaded fitting is bolted to the mold by passing the threaded end of the fitting through a hole in the mold from inside the mold and threading a nut on the end projecting outside the mold. Various other temporary retaining devices may be used for holding the threaded fittings in place against the mold cavity wall. However, the retaining devices must be releasable from the exterior of the mold to permit opening the mold to remove the finished article. Attachments are made to the threaded fittings embedded in the finished article with a suitable cooperating threaded member such as a screw or a nut, depending on the nature of the threaded fitting and the desired type of connection.

What is claimed is:

1. In a method for rotationally molding a hollow article in which a mold is charged with a hardenable synthetic resin, the mold is heated to melt the resin, the mold is simultaneously rotated about at least two different axes, and the resin is caused to coat the interior mold surface and to solidify, the improvement comprising: forming a ring-like assembly by interconnecting a plurality of threaded members in spaced apart relationship by at least two spaced wire support members each having an interior opening larger than a desired opening into the hollow article; temporarily releasably securing said assembly to an interior surface of said mold with said interior openings in said support members located in a position surrounding a desired location for said opening into the hollow article; introducing a charge of said resin into said mold; rotationally molding the hollow article to embed said support members and at least partially to embed said threaded members in said resin; after said resin has at least partially solidified, releasing said threaded members from said mold; removing the hollow article from said mold; and forming said opening into said hollow article through the interior openings in said support members, thereby forming a rotationally molded hollow article having a peripherally reinforced opening into such hollow article and also having threaded members disposed about said opening into such article for threadedly attaching another article thereto.

2. In a method for rotationally molding a hollow article in which a mold is charged with a hardenable synthetic resin, the mold is heated to melt the resin, the mold is simultaneously rotated about at least two different axes, and the resin is caused to coat the interior mold surface and to solidify, the improvement comprising:forming a ring-like assembly by interconnecting a plurality of threaded members in spaced apart relationship by at least two spaced wire support members each having an interior opening larger than a desired opening into the hollow article; disposing said threaded members so that threaded apertures thereof are adjacent said interior mold surface with said interior openings in said support members located in a position corresponding to a desired location for said opening into the hollow article; temporarily releasably securing said assembly to an interior surface of said mold; introducing a charge of said resin into said mold; rotationally molding the hollow article to embed said support members and at least partially to embed said threaded members in said resin; after said resin has solidified, releasing said threaded members from said mold; removing the hollow article from the mold; and forming said opening in the hollow article through the interior openings in said support members, thereby forming a rotationally molded hollow article having a peripherally reinforced opening into such hollow article and also having threaded members disposed about said opening into such article with threaded apertures opening externally of such article for attaching another article thereto.

3. The method of claim 2 wherein said securing step is performed by inserting bolts through openings in said mold and into each of said threaded members to bolt said threaded members in place in said mold, and wherein said releasing step is performed by removing said bolts from said threaded members after said resin has at least partially solidified.

* * * * *